(12) United States Patent
Smith et al.

(10) Patent No.: US 8,995,797 B2
(45) Date of Patent: Mar. 31, 2015

(54) PERIODIC PROBABILISTIC TWO-DIMENSIONAL CLUSTER STATE GENERATOR WITH ARBITRARY INTERCONNECTIONS

(71) Applicant: United States Air Force, Rome, NY (US)

(72) Inventors: Amos Matthew Smith, Rome, NY (US); Michael L Fanto, Rome, NY (US); Paul M. Alsing, Oneida, NY (US); Gordon Lott, Rome, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 14/060,959

(22) Filed: Oct. 23, 2013

(65) Prior Publication Data

US 2015/0036967 A1    Feb. 5, 2015

Related U.S. Application Data

(60) Provisional application No. 61/860,427, filed on Jul. 31, 2013.

(51) Int. Cl.
 *G02B 6/00*    (2006.01)
 *G02B 6/10*    (2006.01)

(52) U.S. Cl.
 CPC ........................ *G02B 6/105* (2013.01)
 USPC ............................................. 385/11

(58) Field of Classification Search
 USPC ............................................. 385/11
 See application file for complete search history.

(56) References Cited

U.S. PATENT DOCUMENTS

| | | | |
|---|---|---|---|
| 2002/0093632 A1* | 7/2002 | Teich et al. | 355/18 |
| 2004/0028334 A1* | 2/2004 | Marazzi et al. | 385/49 |
| 2009/0190759 A1* | 7/2009 | Peev et al. | 380/256 |

FOREIGN PATENT DOCUMENTS

JP    2013109088 A  *  6/2013  ............. G02B 6/122

* cited by examiner

*Primary Examiner* — Jerry Blevins
(74) *Attorney, Agent, or Firm* — Joseph A Mancini

(57) ABSTRACT

A Periodic Cluster State Generator (PCSG) consisting of a monolithic integrated waveguide device that employs four wave mixing, an array of probabilistic Photon Guns, single mode Sequential Entanglers and an array of controllable entangling gates between modes to create arbitrary size and shape cluster states with several constraints. The cluster state is assumed linear or square lattice. Only nearest neighbor qubits are entangled. Such a cluster state resource has been proven to be able to perform universal quantum computing if the initial state is large enough.

7 Claims, 4 Drawing Sheets

US 8,995,797 B2

PERIODIC PROBABILISTIC TWO-DIMENSIONAL CLUSTER STATE GENERATOR WITH ARBITRARY INTERCONNECTIONS

PRIORITY CLAIM UNDER 35 U.S.C. §119(e)

This patent application claims the priority benefit of the filing date of provisional application Ser. No. 61/860,427, having been filed in the United States Patent and Trademark Office on Jul. 13, 2013 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

A cluster state can be loosely defined as an entangled set of qubits arranged in a lattice. Breigel and Raussendorf strictly define a cluster state as "Let each lattice sight be specified by a d-tuple of (positive or negative) integers a$\in Z^d$. Each sight has 2d neighboring sights. If occupied they interact with the qubit a". This implies a cluster state has interaction between all nearest neighbor qubits. In two dimensions (d=2) this can result in a square grid of qubits, of arbitrary size and shape with each qubit connected to up to 4 of its nearest neighbors. All of the internal qubits will have 4 interactions while the edge qubits will have 1, 2, or 3 interactions. Such a two dimensional nearest neighbor (or square) cluster state has been shown to be universal for computation presuming the cluster state is "large enough". It is however possible to create custom cluster states designed to implement a single type of algorithm with less qubits.

Traditional generation of a cluster state consists of an optical table several meters on a side. On this table is a high power laser system such as a pulsed Ti:Sapphire laser. The pump beam is incident on a nonlinear material such as BBO, BiBO or PPKTP etc. The photons from the pump then have a small change to undergo Spontaneous nonlinear Parametric Down Conversion (SPDC) to create an entangle pair of photons, called signal and idler photons. Alternative means of photon generation are equally valid such as Four Wave Mixing (FWM). To create larger clusters the pump passes through multiple nonlinear materials (a cascade) or is reflected back onto it (a multi-pass pass). These methods can create multiple independent pair of qubits. To create one large cluster state the pairs are sent through (i.e. acted on by) a maximally entangling gate. Normally the Controlled Z Gate or "CZ" gate is used. The simplest and most efficient means of implementing the CZ gate requires 3 bulk optical asymmetric beamsplitters in a specific alignment. Once all the entangling operations are successfully complete the cluster state is fully constructed and an algorithm can be implemented as a sequence of measurements each on a predetermined qubit.

Generating cluster states beyond four qubits and one CZ gate represent significant experimental difficulties. The SPDC action is relatively inefficient, especially for generating large numbers of photon pairs. The probability of generating n+1 pairs compared to n pairs is approximately 1/1000. This number varies with setup and nonlinear material but is a useful rule of thumb. Thus it rapidly becomes unlikely that a sufficient number of photons are generated in any one time window. Also the CZ gate itself is probabilistic, with a success rate of 1/9. Thus each entangling operation decreases the rate of successful cluster state construction by nearly an order of magnitude. To generate statistics for large cluster state operations, experimentalists are routinely required to wait minutes even hours between successful cluster state generation events.

A significant improvement on cluster state generation is possible with on demand photon sources. Such a source emits a single photon or pair of photons at a specified time, eliminating the need for probabilistic photon generation. No such device currently exists. As an approximation to an on demand source, the "photon gun" was recently proposed by Mower Englund (WO2013009946 A1). This device remains probabilistic but has a relatively high probability of producing a single photon at a predetermined time and is in fact intended to be periodic. In other words it will with relatively high probability emit a single photon after time T. The photon gun creates pairs of photons via probabilistic means from time 0 to T−1 and then detects (and thus destroys) the presence of one of those photons to herald the presence of the remaining photon. This heralded photon is then delayed in a variable circuit until time T. The device is nearly periodic because the probability of at least one pair being generated before time T−1 is close to 1. Thus the photon gun sacrifices repetition rate in order to maximize the photon production probability.

OBJECTS AND SUMMARY OF THE INVENTION

Briefly stated, the present invention proposes to combine multiple "photon guns" with integrated tunable circuitry and entangling operations to create a periodic probabilistic 2D photonic cluster state with the additional feature of being having independent control (on/off) of each the entangling operations (i.e. internal interconnections). Given that the number of modes is large enough, the cluster states created by the present invention will be able to perform universal computations. In addition, the control of the internal interconnections allows for the construction of arbitrarily shaped and interconnected cluster states as well as multiple (smaller) cluster states from a single device. These controls will be simple electrical inputs and can be switched at high speed. The resulting device attempts to produce a desired cluster state after every time $T_{CS}$. We call the present invention a Periodic Cluster State Generator (PCSG).

A preferred embodiment of the present invention (PCSG) consists of a monolithic Integrated Waveguide (IW) chip consisting of two fundamental operations, photon generation and controllable entanglement. To produce the cluster state at high speeds while minimizing the waveguide length, the waveguide chip must be capable of rapid switching. Electro-optical materials such as Lithium Niobate ($LiNbO_3$), as opposed to slower thermal switching materials, are preferred. Note the present invention will work in materials with slow switching but will have longer delay lines and may need to be larger itself to compensate. The waveguides fabricated within the $LiNbO_3$ must be polarization maintaining (PM) waveguides as the invention encodes the qubits in the photons polarization.

The preferred embodiment of the present invention generates photons on the principle of FWM as has been demonstrated in waveguides previously. The invention consists of two input modes. One for each of the two "waves" needed to pump the device. These modes are incident on an integrated two by N splitter based on evanescent coupling, where N is the number of guns in the device. This number, N, has no theoretical upper bound. This element separates the pumps evenly into the N modes in which the four wave mixing takes place. Such a device simplifies the problem of maintaining synchronization between modes that is otherwise difficult if each mode is individually pumped. The photons created will have orthogonal polarizations which can be set to horizontal and vertical. In order to increase the count rate for this probabilistic process the invention has large equal length meanders in each wave guide that increase the interaction time. Note that any device or method that creates photon pairs could be used with trivial modifications to the circuit design.

In the preferred embodiment the photons in the waveguides are incident on hyper-spectral filters which block the propagation of both pumps. The position of the spectral filtering is not critical to the design and can be performed anywhere in the circuit after the FWM has occurred including at the end of the circuit. To use non-degenerate FWM, this filter would be replaced with a standard wave division multiplexer (WDM) which dumps the pump wavelengths into a mode that exits the IW chip while allowing the signal and idler photons to propagate. Any such device that separates the pump photons from the desired photons is usable in this invention.

In the preferred embodiment the signal and idler photons travel along another section of waveguide of arbitrary size and shape and are incident on MMI. This MMI acts as a polarization beam splitter and separates the horizontal and vertical photons into two separate modes (any device that accomplishes this goal is equally valid in present invention). One photon (which polarization is used is not relevant) is detected and therefore destroyed. This is done in order to herald the existence of the second photon in the propagating mode. The type of device used to detect the present of this photon is not relevant to the present invention and can be either on the IW or off chip. The preferred embodiment of the present invention will use off chip single photon detectors such as superconducting nanowire single photon detectors or transition edge sensors. Such detectors can be fabricated directly into the IW itself but require <10K (kelvin) temperatures to operate. Thus integrating the detector requires super cooling the entire chip. The preferred embodiment of the present invention operates at room temperature by channeling the heralding photon into an optical fiber which can be routed to any type of single photon detector. As the efficiency of this detector is critical to the devices operation the most efficient available detector is desired. Note that the present invention can be designed to operate with low efficiency detectors and a given pump rate by increasing the number of delay segments (defined below) at the cost of reducing the repetition rate. As the previous section of the present invention creates photons with known orthogonal polarizations and, as all waveguides are polarization maintaining, it is a trivial process to rotate the photons to the H+V, or the "+" state (ignoring normalization) by industry standard devices. This can be done at any point prior to the entangling operations.

The photon pair generation method and heralding detection method of the present invention is relatively arbitrary in that the invention can be modified to accommodate different designs. Regardless of the photon generation and detection method, the next step of the "photon gun" is critical. See Mower and Englund (WO2013009946A1). Each pump pulse has a non-unitary (i.e. less the perfect) chance to create a photon pair and the detectors have less than perfect chance of detecting one of these photons. Thus each pulse will not create a photon, in even the most ideal case. Different techniques can be used to improve these probabilities but cannot be made perfect with the current state of the art technology. Thus the "photon gun" is not periodic but probabilistic. The present invention is also probabilistic as it generates photons with period T and success probability approaching one. The critical time bucket T consists of N time bins t such that each bin is synchronized with one and only one pulse form the pump (T=Nt). The number of time bins required is determined such that with very high probability at least one photon pair is produced and heralded in each time bucket T. This is dependent on a large number of factors but can be determined by standard methods.

The heralded but undetected photon, now in the "+" state, is then delayed in delay lines until it is emitted at time T or T+1. This is achieved through a series of identical delay lines which the heralded photon can be diverted into by rapidly tunable MMIs. The switches that control the photon path and therefor the delay time are controlled by off chip electronics. This device records the detection time of the heralded photon and compares it to the clock time. Thus the off chip electronics can determine in which time bin $t_p$ the photon pair was generated and the needed delay time $(T-t_p)$. Next, the electronic device sets the output ports for the tunable MMIs (i.e. switch directions) to implement the required delay. In the preferred embodiment this is done with industry standard electro optical control. While this calculation and reconfiguring is taking place the photon is stored in a simple waveguide meander consisting of a long spiral in the wave guide. The length of this first delay, Delay A, is determined by the maximum time required to herald and successfully reconfigure the device and, in general, will not be the same (most likely longer) as the time bin delay lines. These steps happen simultaneously in each parallel mode. The result of the first section of the present invention is a periodic (in time) sequence of synchronized arrays of N photons. In other words this first section of present invention creates an un-entangled flowing grid of photons of size N and arbitrary length. The probabilistic nature of the present invention means there will be some holes in the grid where no photon was successfully produced or a photon was lost.

The photons are then guided to the next section part of the present invention that performs the controllable entanglement on the photon grid. In the preferred embodiment these two sections are both on the same monolithic IW chip. But fabrication may be simpler if the device is fabricated on two (or more) chips. The monolithic WG chip has the advantage of compactness, stability and no losses due to coupling chips into and out of fibers.

The second section of the Monolithic IW chip in the preferred implementation creates the horizontal entanglement between sequential qubits. This is an application of the sequential entangler of Smith et al. and in fact requires an array of sequential entanglers. In the preferred embodiment the tunable MMI at the end of the "photon gun" serves a dual purpose. In addition to controlling the delay time it also transfers the output photons to one of two modes. In the preferred embodiment the MMI begins by putting the first photon in the "upper" mode. This means that the incident photon exits the MMI in the "upper" mode. Any device that is capable of deterministically switching the output mode of a photon is a viable alternative which doesn't affect the function of the device. The first photon, arriving in each parallel mode after time T, is then delayed in a waveguide delay line, Delay G, for exactly one period of time T. The MMI is then switched to the "lower" mode before the arrival of the second photon at time 2T by an off chip electric circuit. The maximum repetition rate of the present invention is thus limited by the minimum switching time of the MMIs or any device that replaces it The two separate "+" state photons, one in the upper mode and one in the lower mode, are then each incident on another MMI. One output mode of each of these MMIs feeds into the entangling operation. The other leg of each MMI is routed around the entangling operation in a "by pass" mode. This routing operation is implemented in the same manner as previous MMIs and is controlled buy off chip electronics. In the preferred embodiment the entangling operation is performed in the waveguide integrated CZ gate of Crespi et. al (W02012150568A1). This gate is well-known and has been implemented in waveguides. The gate consists of several static evanescent couplers. The current state of the art of entangling operations provides many implementations of this gate and numerous other gates. Any of these gates may be used to create variations of the present invention for custom purposes. The CZ gate has a success probability of 1/9 per instance. Therefore, long chains are increasing unlikely to be successfully created. Thus a high repetition rate is desirable, such that many attempts can be made in a short time. Also any improvement in the success rate of the entangling gate is desirable. The length of the bypass mode is designed such that it is the same as that in the entangling operation.

The modes from the entangling operation are then merged with the "by pass" modes by additional MMIs. One photon is allowed to propagate while the other is "looped back" into the device to such that it can be entangled with the next photon in the sequence. Thus two photons in sequence in each parallel sequential entangler are entangled or not entangled based on the paired MMIs prior to the CZ operation. Rapid switching gives the capability to "add" or "remove" horizontal entanglement in between any sequential qubits in a cluster state.

The third photon produced in each mode reaches the sequential entangler while one photon from the first pair is stored in a delay line, Delay H. The length of this delay line is such that these two photons will be synchronized upon reaching the paired MMIs before the CZ gate. The third and all subsequent photons are routed onto the "down" path. Which photon is "looped back" cannot be determined due to the nature of entanglement. Therefore, either mode may be fabricated with the "loop back" feature.

The photons then exit the parallel set of sequential entanglers in the present invention and enter the final section of the device. This section implements the vertical entangling gates between synchronized qubits in different modes. This section consists of a cascade of entangling operations. In the preferred embodiment these entangling operations are again the CZ gate of Crespi et. al (W02012150568A1). Similar to the last section any entangling operation can be used in place of any or all of the CZ gates for custom purposes. The CZ gates are placed such that each mode interacts with its neighbors, and this condition can be relaxed for specific purposes without material changing the invention. The photons are incident on MMI which, similar to above, have one output routed to the CZ gate and one output routed to a "by pass" line. The MMI are controlled by off chip electronics and rapid switching, (i.e. faster than the photon repetition rate allows for) controlling the placement of vertical entanglement between specific qubits (i.e photons). Delay lines may be used to maintain synchronization of all modes.

Combining the effect of the controllable MMIs allows for any size and shape cluster state to be created, within the following limits. The square shape of the grid remains, specifically, the maximum size of the grid N is set by the fabrication of the device and in the prefer embodiment only nearest neighbor interactions are possible. Any arbitrary number and shape of connections is then possible by preforming rapid switching of the various paired MMIs which control the "by pass" lines around each individual entangling operation. If all of the CZ operations are used the resulting output (in theory) would be an arbitrarily long flowing grid of entangled qubits, N rows tall. In practice the probabilistic nature of the present invention means that attempting to make larger and larger cluster states and states with more entangling interactions becomes increasingly unlikely. This is also true of any state of the art device and implementation. The high repetition rate possible with the monolithic IW implementation of the present invention allows for many attempts to be made in comparatively short time frames (i.e. a high repetition rate) with excellent stability and limiter coupling losses. Thus, relatively large and complicated cluster states can be made with the present invention that would be impractical with other approaches.

An alternate embodiment of the present invention for the purpose of MBQC exists. Here rather than outputting the cluster state from the chip, additional hardware is fabricated such that quantum enhanced computation can be performed. Such an alternate formulation can be considered a quantum computer on a single chip. The size of the computation is limited only by the number of output modes the device is fabricated with. A 2 dimensional square nearest neighbor grid has been shown to be a universal resource form MBQC, thus we can say the quantum computer is universal. Note that arbitrarily large calculations will require arbitrarily large cluster states and due to the non-deterministic generation of cluster states in the present invention such arbitrarily large state will take an arbitrarily long time to successfully generate.

Note that in the preferred implementation, the off chip electronics are broken into three chips each serving its own purpose. "Off chip electronics 1" detects/heralds the presence of photons and reconfigures the delay line circuit. "Off chip electronics 2" controls the placement of the entanglement in the cluster state. "Off chip electronics 3" an alternate embodiment implements the MBQC algorithm of single qubit rotation detection events. These three chips can be combined into a single classical device without altering the details of their operation. In fact combining the off chip electronic into a single circuit will make synchronization simpler.

DETAILED DESCRIPTION OF THE PREFERRED EMBODIMENT

Figure 1:
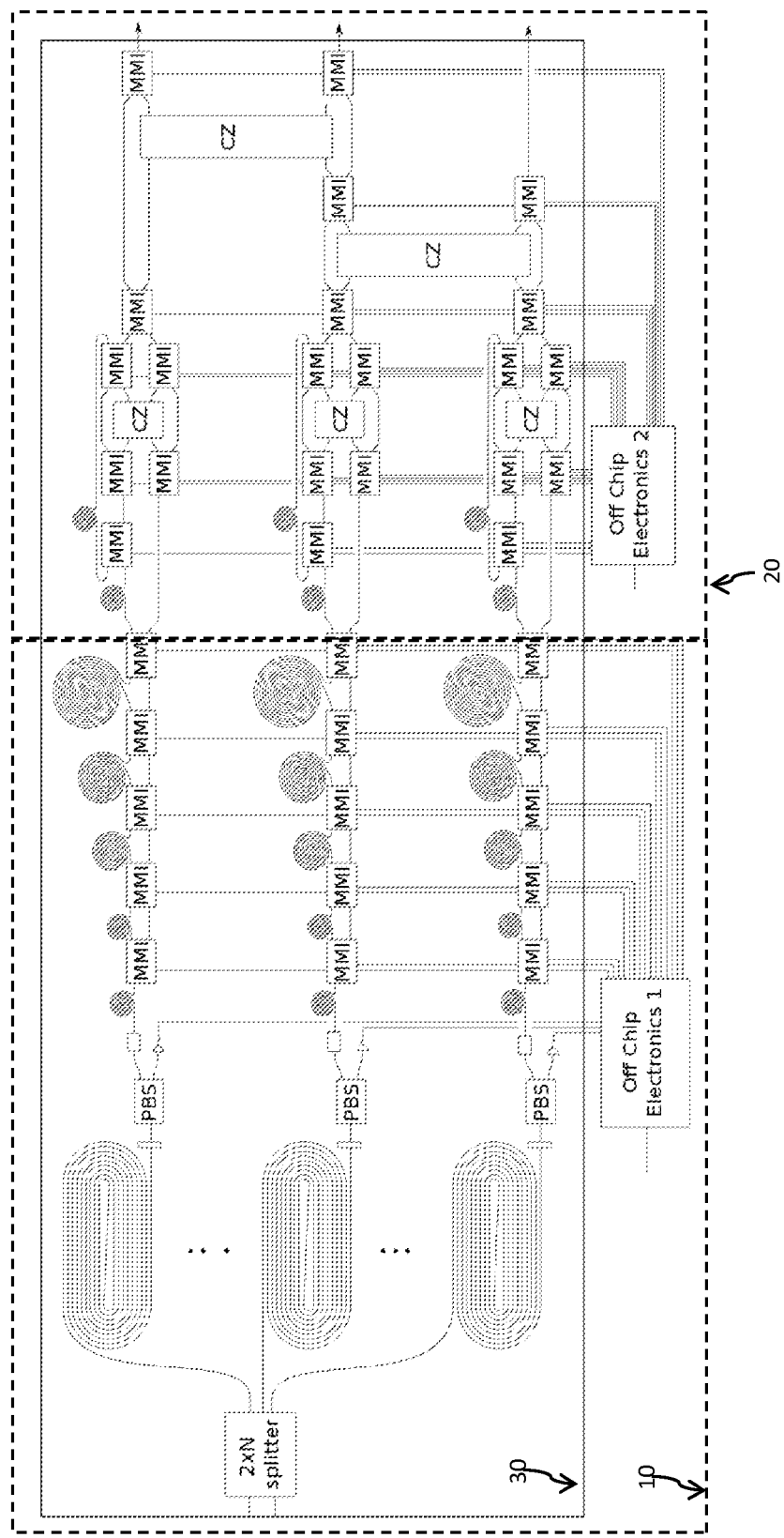
FIG. 1 depicts the full monolithic integrated waveguide based implementation of the present invention with dashed boxes indicating the three sections of the device as described below.

Referring to FIG. 1, the present invention (i.e., a Monolithic IW PCSG) is shown with dashed boxes, 10 and 20 indicating the two sections in which different operations are performed (periodic single photon generation 10 and entanglement 20). The preferred chip IW 30 is a single large (monolithic) chip of Lithium Niobate ($LiNbO_3$). This material is chosen due to the ability to perform the four wave mixing the present invention uses as a photon source as well as the high switching speed of the electro-optical effect. This allows for faster repetition rates and faster probabilistic cluster state creation than other materials that require carrier injection or thermal switching.

Figure 2:
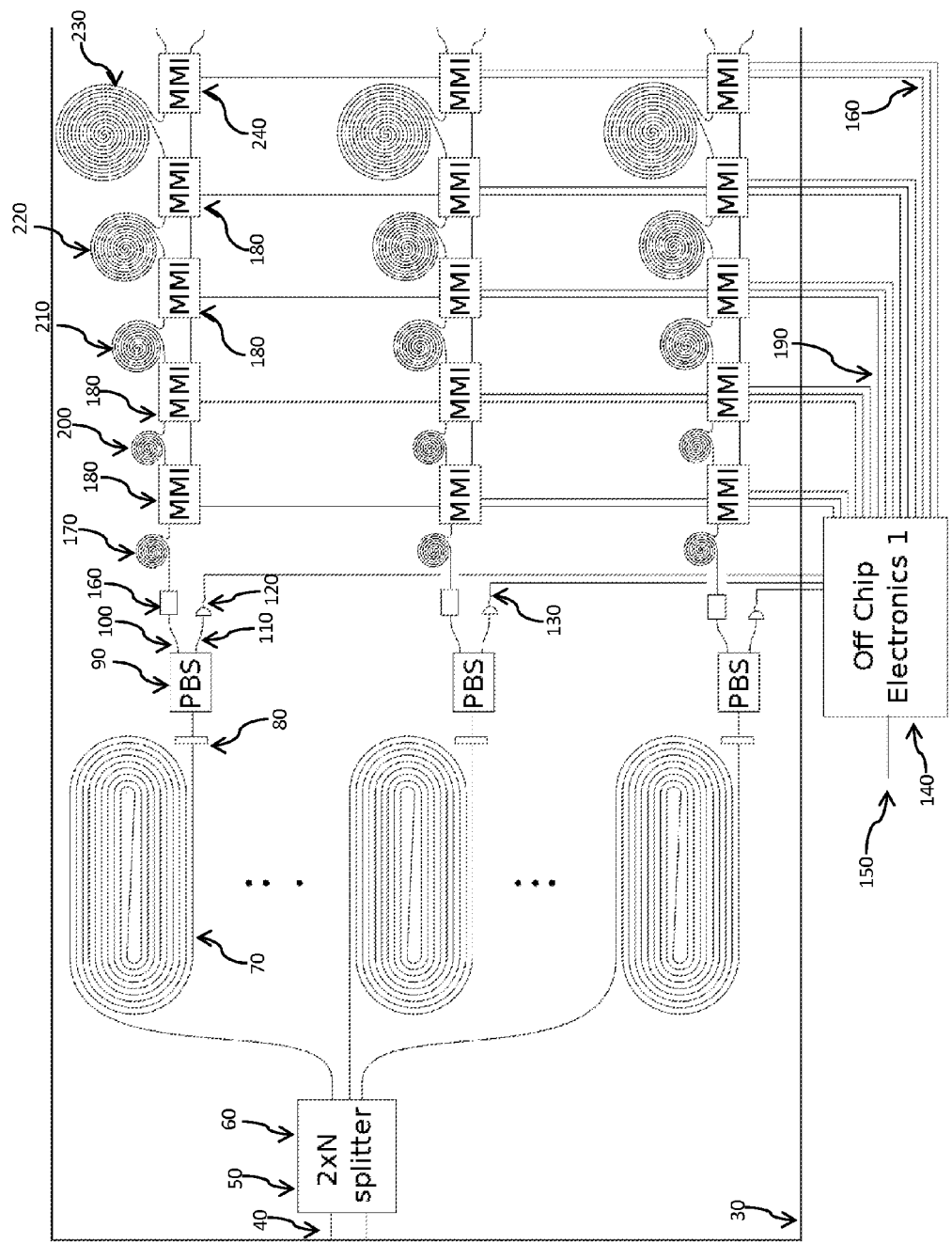
FIG. 2 depicts the section of the present invention which uses four wave mixing to probabilistically create periodic (in time) photons in each mode. The number of output modes is arbitrary and is depicted here with N=3 modes but not limited to this number of modes.

Referring to FIG. 2, shown is the first section 10, in FIG. 1 of the monolith IW chip 30. The inputs to the present invention are two modes 40 each originating from a pump laser. These two pump modes are both incident on a 2 by N splitter 50 that evenly divides the input signal among all of its output modes 60. In these modes 60 the four wave mixing takes place. The four wave mixing modes 60 each have a large meander 70 or arbitrary shape. The purpose of this meander 70 is to increase the interaction time and therefore the generation rate of the modes. The meanders 70 relative lengths to each other are arbitrarily adjustable and should be set such that the photon pulses in every mode arrive simultaneously at the hyper-spectral filters 80. This method of generating the spontaneous photons differs from that of Mower and Englund. The hyper-spectral filters 80 block the pump pulse while allowing the degenerate spontaneously generated four wave mixing pairs to propagate. The hyperspectral filter 80 also prevents further four wave mixing in the remainder of the circuit. The degenerate photons created by the four wave mixing are orthogonally polarized with one photon having the same polarization as the two pumps. Thus the two photons can be separated by a simple polarization beam splitter (PBS) or equivalent device 90. Such a PBS 90 can be implemented in the present invention's waveguides with simple evanescent couplers. The PBS 90 is represented here as a simple box for simplicity as they are well known devices in the state of the art.

The outputs of the PBS 90 are two modes each 100 and 110. One mode 110 from each PBS 90 all carrying the same polarization, the preferred embodiment uses the vertical polarization (this choice is arbitrary), is channeled to an integrated single photon detector 120. Any type of single photon detector 120 can be used including off chip detectors. Such off chip detectors require channeling the photons into fibers. Such detectors are standard in the industry.

The output of the detectors 120 is carried by wire 130 to off chip electronics 140. The time of the detection by any photodetector 120 event is determined by industry standard off chip electronics 140. The off chip electronics 140 will be provided with a clock signal 150 produced by standard pump laser systems. The purpose of the off chip electronics 140 is to measure the time bin (t) at which each photon arrives and to modify the circuit such that each photon is delay until the end of the time bucket (T) as discussed above.

The horizontal photon from each PBS 90 in each mode 100 is each routed to a polarization controller 160 which rotates the state to the |+> state. The polarization controller 160 is shown as a static device as the input polarization is assumed to be constant. If this is not the case a variable device can be trivially substituted. Note that the polarization rotation need not occur at this exact point in the circuit but be implemented anywhere after the filter 80 and before the entangling operations begin in second section 20 of the present invention.

The photon is the routed by waveguide 100 to a long waveguide meander 170 of arbitrary geometry, shown here as a spiral. Any device which implements a set delay, such as but not limited to toroidal resonators, fiber delay lines and cold atomic gas cells, may be trivially substituted for any delay meander in this device. The purpose of delay 170 is to store one photon from each pair while the second is being detected and the arrays of tunable MMIs are modified.

The MMI 180 is a standard state of the art device and as such is not shown in detail. In $LiNbO_3$ of the monolithic IW 30 the MMI 180 is an electro-optically tuned device. An electrode induces a change in index due to an applied voltage (electro-optical effect). This is indicated with logical control lines 190 from the off chip electronics 140 each of which terminate at a unique MMI 180. The MMIs 180 act as independent switches which depending upon the induced index change can diver a photon in any input mode to any output mode. Control over each MMI 180 individually is required for the device as the probabilistic photons in each mode will arrive at different time bins (t) and need different delay meander lengths 200 through 230. Each MMI 180 has one output that routes directly to the next MMI 180 (zero delay) and one mode that forms a delay meander 200 though 230. The length of each delay is a multiple of the pump period t. Each meander is twice the length of the previous with the first delay meander 200 being a delay of t. Thus one pass through any set of delays 210 retards the photon by a controllable time from 0 up to T. Thus the first section 10 of the present invention creates a periodic array of photons every time T. The delays meanders 200 through 230 are shown as 4 delays giving a maximum delay of 15t. The number of delay meanders 200 through 230 is arbitrary and only affects the periodicity of the device.

The final MMI 240 in each mode has two outputs 250 and 260. The MMIs 240 complete the first section of the device. At this point, the output of the MMI 240 are photon that are (ideally) periodically spaced and still synchronized such that one photon is emitted into the modes 250 and 260 every time T. Given the probabilistic nature of the present invention, the case in which a given mode MMI 140 does not produce one and only one photon at time T can be minimized but not avoided. This is due to effects including but not limited to photon loss and detector inefficiency.

Figure 3:
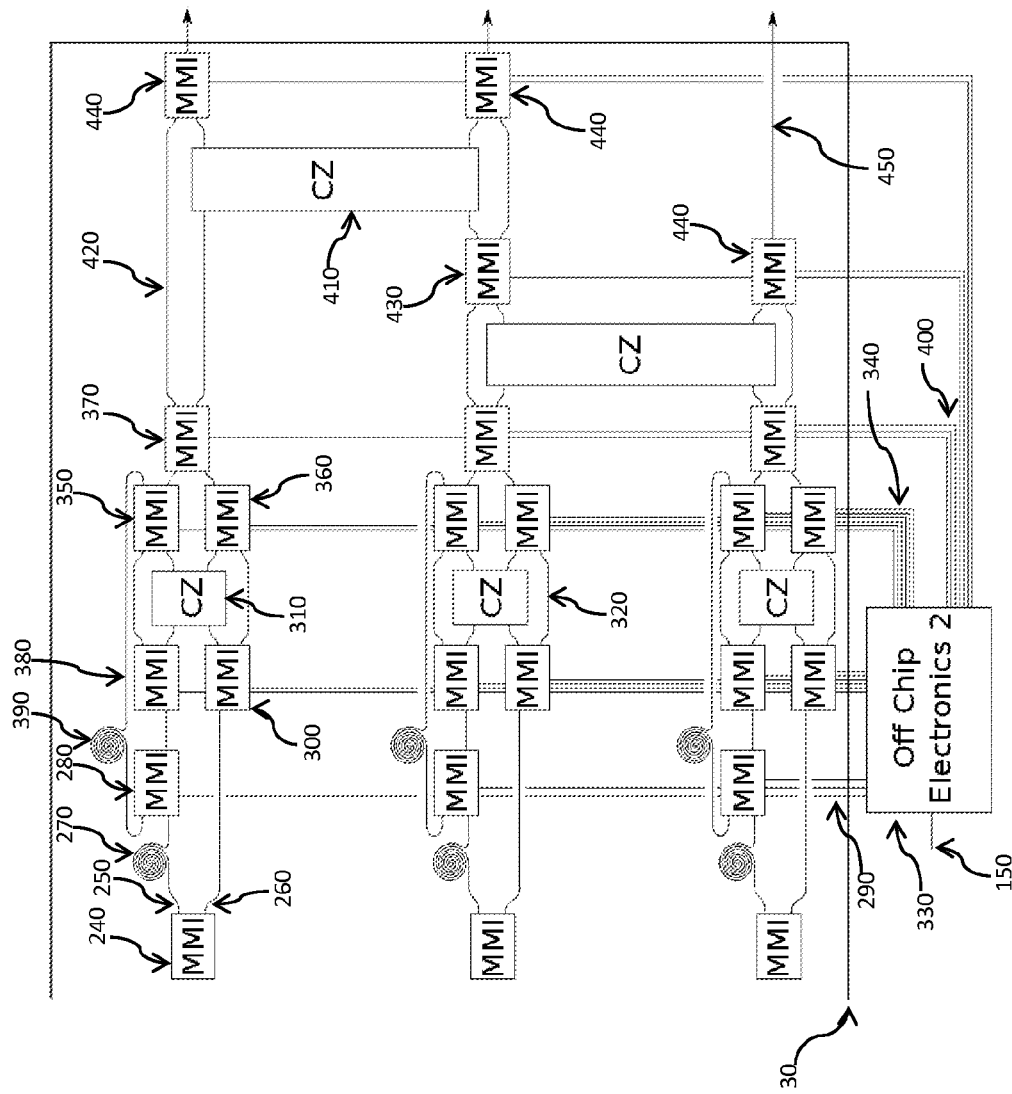
FIG. 3 depicts the section of the present invention in which the horizontal entanglement is implemented creating probabilistic linear cluster states in each mode. This section includes the "loop back" and controllable entanglement "by pass" elements.

FIG. 3 shows the second section 20 of the present invention in the preferred embodiment. This section of the present invention probabilistically creates entanglement between sequential periodic photons in each mode and then creates entanglement between neighboring modes.

MMI 240 acts as a switch between its output modes 250 and 260. It is the same type of device as in the previous section of the present invention described in the description of FIG. 1.

When the first set of photons enters this section 20 of the present invention, the MMIs 240 are set to divert the photon into the "upper" mode 250 and the array of photons are each sent into respective delay lines 270. After this the MMI 240 is switched to the "lower" output mode 260. The length of the delays 270 is set such that they are all exactly (i.e. well within one time bin t of the detector) the period T of the photon generator in the previous section 10 of the present invention. Thus when the first photon exits the delay line 270 it is synchronized (i.e. in parallel) with the second photon which has arrived from section 10 and passed through MMI 240. The upper photon then passes through MMI 280 such that it exits the only utilized port, the path length of the lower mode 260 should be adjusted during fabrication to compensate for any difference in transit times due to the MMI 280. MMI 280 is controlled by logical control lines 290.

The two photons are then simultaneously incident on pairs of MMIs 300. These pairs of MMIs work together to either direct both photons into the entangling operation 310 or to direct both photons into the "by pass lines" 320. This ability to choice the route of the photons (in advance or dynamically) allows for the probabilistic construction of arbitrary interconnected cluster states (i.e. cluster states up to a set size and shape) and is controlled by the off chip electronics 330 via control lines 340 and synchronized by the same clock signal 150 as in section 10. Note that the length of the "by pass" lines 320 should be set such that the travel time of both paths ("by pass" 320 and entangling 310) are the same. The entangling operation in our preferred embodiment is the CZ gate of Crespi et. al. This gate is implemented in waveguides as several fixed evanescent couplers. The gate is probabilistic with a success rate of 1/9 and requires 4 modes 2 of which enter as vacuum. See Crespi et. al (W02012150568A1) for details.

In the preferred embodiment, after passing through either the entangling operation 310 or the "by pass" lines 320 the synchronized photons enter the second paired MMIs. MMI 350 is in the upper path. MMI 360 is in the lower path. These MMIs are also controlled by the logical control lines 340. MMI 360 acts to feed the input photons to MMI 370. MMI 350 is more important as it takes input photons and feeds them into the "loop back" feature 380 or to the MMI 370.

A successful application of the CZ gate will produce one photon in each output and thus one photon in both MMIs 350 and 360 (equivalently use of the "bypass" lines" 320 will do the same). MMI 350 then feeds one photon into the loopback line 380. The other photon is channeled into MMI 370.

The loop back 380 is in essence a delay line and may require a meander 390. The photon in this mode then enters MMI 280 which has been "switched" by the electronics 290 and 330 such that it exits the only viable port. The length of 380, 390 and 280 are adjusted during fabrication such the a photon that enters 380 will exit MMI 280 and be incident on MMI 300 at the same time that the next photon in the sequence produce in section 10 reaches MMI 300. In other words the delayed photon is held for one period until it is synchronized with the next photon in the sequence. Thus the CZ gate 310 which acts on simultaneously incident qubits is made to act on sequential qubits in each "single" mode.

This process then repeats to create a chain of arbitrary length (assuming the CZ gate succeeds each time). When the entangled chain reaches the desired length, several things happen to terminate the chain. The last photon in the chain is sent into the loop back line 380 one last time. The MMIs 300 are set to the "by pass" path and MMI 350 is switched to the "down" path to MMI 370. At the same time MMI 240 is set to "up" sending the next incident photon to delay line 270. This allows the last photon in an arbitrary chain to leave this section of the device, creates a guaranteed break in the cluster state and it also effectively resets the device. Recall that the first step in creating the chain was to send photons to delay line 270 via MMI 240.

MMI 370, which is controlled by logical control line 400 and clock signal 150, acts as a switch similar to MMIs 300. MMI 380 switches the photons either into the entangling operation 410 or to the "by pass" lines 420. The order of the entangling operations 410 between neighboring modes is completely arbitrary if CZ gates are used, as in the preferred embodiment. The number of modes will determine the number of entangling operations 410 and the number of "internal" MMIs such as MMI 430. Each entangling operations 410 has a pair MMIs preceding and following it such that each entangling operation can be independently "by passed". The photons then exit the final MMIs 440 in each mode and exit the chip 30 via output mode 450.

The ability to rapidly switch the MMIs 370, 430 and 440 gives the PCSG the ability to turn the entangling operation between modes on or off arbitrarily. Combined with the ability to control the entanglement in the chains themselves (via 300 and 340 and 350) the PCSG can create and arbitrary size cluster state (up to the fabricated number of modes, which itself is arbitrary) with arbitrary and controlled interconnections. Thus it is a device with versatile output that can be used in a large array of applications, Including but not limited to Measurement Based Quantum Computing (MBQC), Quantum Key Distribution (QKD) and various communication protocols.

Figure 4:
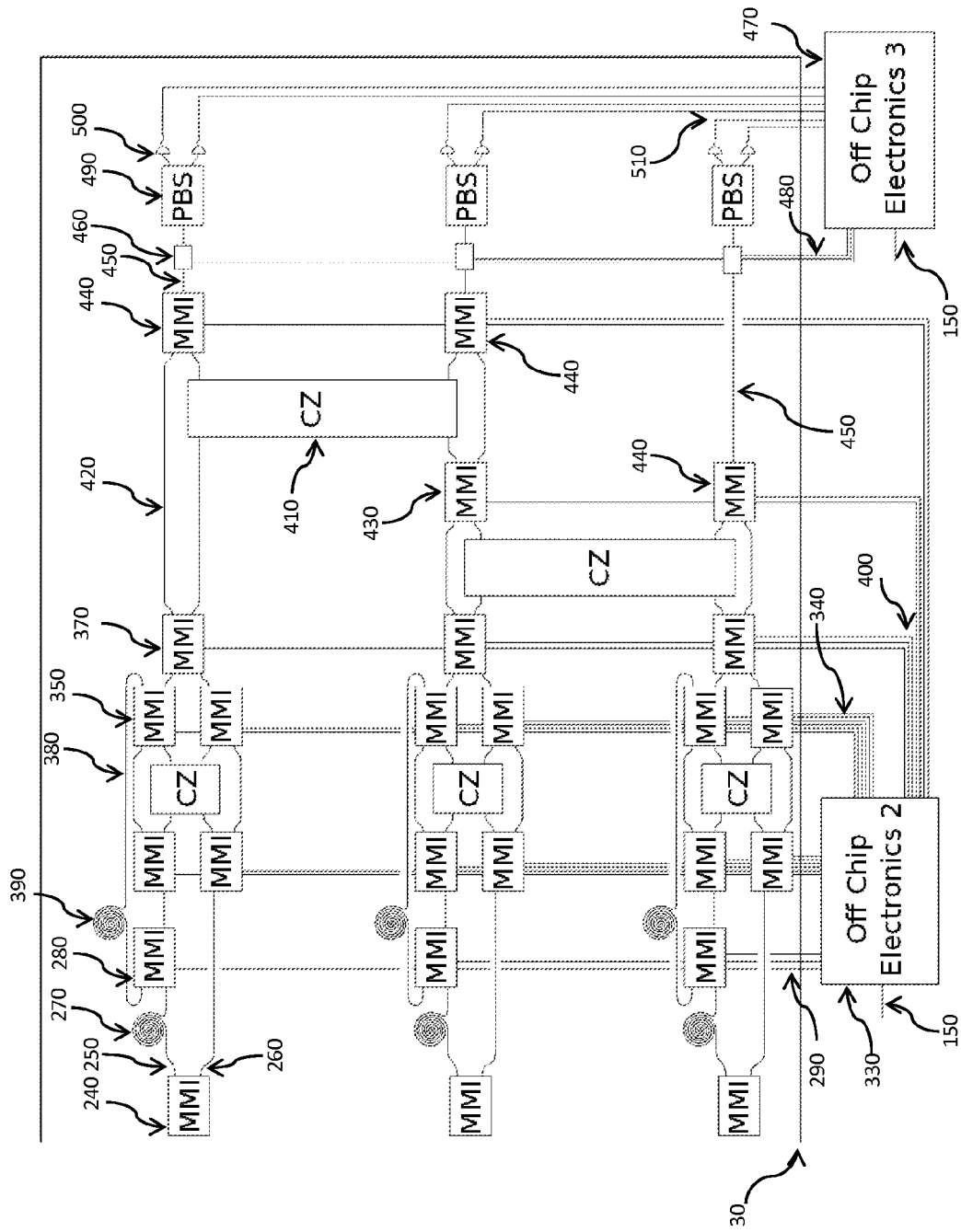
FIG. 4 depicts an alternate embodiment of the present invention having additional functional hardware.

FIG. 4 gives an alternate formulation of this device for the purpose of MBQC. This formulation includes all aspects of the PCSG however rather than releasing the photons after via mode 450 in section 20, shown in FIG. 3, additional hardware is implemented. All of the elements in FIG. 3 are repeated in FIG. 4 except that mode 450 no longer exits the chip. To perform computations in the style of MBQC, each qubit in the cluster state generated by the PCSG is measured in a prescribed basis. This is accomplished by rotating each qubit individually in the Z basis and then detecting photons in either the |+> or |-> state. Different arrangements of the entanglement and different measurement angles will produce different computations.

In FIG. 4 mode 450 channels the photons to arbitrary polarization controllers 460. The polarization controllers are themselves set by off chip electronics 470 and logical control lines 480. After being rotated by polarization controllers 460 the photons are incident on polarization beam splitters 490 set for the +/− basis. The photons are then separated into + and − in two modes which can be detected with standard integrated single photon detectors 500, similar to 120 in FIG. 2. One photon will activate one of each pair of detectors 500. This can be used as a post selection condition to be certain that the generation, entanglement and measurement of the photons occurred successfully. The output 510 of the detectors 500 is recorded for each qubit by the off chip electronics. This set of information (i.e. the result of the rotated +/− measurement) is required for applying post process correction require by the MBQC formulism. Such corrections consist of single qubit rotations and could be physically implemented to the output qubits of the cluster state. In the preferred embodiment these corrections will be applied by software after the measurement of the output state. This simplifies the device and reduces the number of rotations that need to be implemented on the output qubits.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A photonic cluster state generator, comprising
an optical divider stage having an input into which photons from a photon source are applied, and a plurality of optical divider outputs among which said photons are evenly divided and output;
a like plurality of polarization and delay stages for synchronizing said photons in time;
a like plurality of first entanglement stages for creating entangled chains of said synchronized photons,
wherein each of said first entanglement stages comprise
a plurality of delay lines for synchronizing said photons in time;
an entangling gate having bypass and entangling inputs and bypass and entangling outputs for selectively entangling said photons; and
a plurality of multimode interferometers for selectably routing said photons, in response to signals from said controller, through any of said interconnecting optical waveguide to any of said plurality of delay lines and entangling gate inputs and outputs;

a plurality of second entanglement stages for entangling said photon chains so as to produce and output cluster states;

a controller for selectably controlling said delay and entanglement of said photons and photon chains; and a clock source for synchronizing said controller with the arrival of said photons;

wherein optical divider stage, polarization and delay stages, first entanglement stages, and second entanglement stages are fabricated as integrated optical components on a chip, each being interconnected by optical waveguide disposed therein.

2. The apparatus of claim 1, wherein each of said polarization and delay stages further comprises an optical meander line connected to each of said plurality of optical splitter outputs so as to increase photon interaction time, each said optical meander line having an input and an output;

a hyperspectral filter connected to the output of each said optical meander line so as to prevent further four-wave mixing;

a polarization beam splitter connected to said hyper spectral filter for separating photons having orthogonal polarizations into first and second polarization output modes;

a photon detector connected to said first polarization output mode, said photon detector being in communication with said controller to adjust said polarization delay stages so as to achieve photon synchronization; and a polarization controller connected to said second polarization output mode for rotating the polarization state of said second polarization output mode.

3. The apparatus of claim 1, wherein each of said polarization and delay stages further comprises a plurality of cascaded multimode interferometers each having a first and second input and a first and second output;

a delay line of predetermined length connected at said first input through which photons are delayed prior to entering each of said multimode interferometers; and wherein each of said multimode interferometers is responsive to signals from said controller so as to route said photons in from either said first or second input, and out through either said first or second output.

4. The apparatus of claim 3, wherein the delay line length of each subsequent said delay line in said cascade is twice that of an immediately prior said delay line in said cascade.

5. The apparatus of claim 1, wherein each of said second entanglement stages comprise an entangling gate having bypass and entangling inputs and bypass and entangling outputs for selectively entangling said photons; and a plurality of multimode interferometers for selectably routing said photons, in response to signals from said controller, through any of said interconnecting optical waveguide to any of said plurality of entangling gate inputs and outputs.

6. The apparatus of claim 5, further comprising a polarization controller for rotating the polarization of said photons output by each of said second entanglement stages;

a polarization beam splitter for separating said polarization-rotated photons into two modes; and a photon detector to detect photons in each of said two modes, wherein said photon detector output is recorded in said controller.

7. The apparatus of claim 1, wherein in each of said first entanglement stages, photons may be selectively routed through said entanglement gate or through a bypass path, said bypass path having said delay line disposed therein; and wherein said delay line length is selected so as to provide an equal photon transit time through either said entanglement gate or said bypass path.

* * * * *